(12) United States Patent
Loui et al.

(10) Patent No.: US 6,915,011 B2
(45) Date of Patent: Jul. 5, 2005

(54) EVENT CLUSTERING OF IMAGES USING FOREGROUND/BACKGROUND SEGMENTATION

(75) Inventors: Alexander C. Loui, Penfield, NY (US); Matthieu Jeanson, San Jose, CA (US); Zhaohui Sun, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 602 days.

(21) Appl. No.: 09/819,385

(22) Filed: Mar. 28, 2001

(65) Prior Publication Data

US 2002/0168108 A1 Nov. 14, 2002

(51) Int. Cl.$^7$ .............................. G06K 9/62; G06K 9/34
(52) U.S. Cl. ...................................... 382/224; 382/173
(58) Field of Search ................................ 382/103, 164, 382/170, 171, 173, 175, 176, 190, 224, 225; 707/104.1, 3, 4, 7; 358/538; 348/169

(56) References Cited

U.S. PATENT DOCUMENTS

| | | | |
|---|---|---|---|
| 5,852,823 A | 12/1998 | De Bonet | 707/6 |
| 5,911,139 A | 6/1999 | Jain et al. | 707/3 |
| 6,011,595 A | 1/2000 | Henderson et al. | 348/590 |
| 6,072,904 A | 6/2000 | Desai et al. | 382/225 |
| 6,282,317 B1 | 8/2001 | Luo et al. | |
| 6,351,556 B1 | 2/2002 | Loui et al. | |
| 6,606,411 B1 | 8/2003 | Loui et al. | |
| 6,707,939 B1 * | 3/2004 | Weinholz et al. | 382/164 |
| 2002/0037103 A1 * | 3/2002 | Hong et al. | 382/173 |

OTHER PUBLICATIONS

Foregroung/Background segmentation of color images by integration of multiple cues, by Huang et al, IEEE 1995 pp. 246–249.*
Event clustering of consumer pictures using foreground/background segmentation by Loui et al., IEEE 2002, pp. 429–432.*
"Automatic Image Event Segmentation and Quality Screening for Albuming Applications" by Alexander C. Loui and Andreas E. Savakis.
"AutoAlbum: Clustering Digital Photographs using Probabilistic Model Merging" by John C. Platt.

* cited by examiner

Primary Examiner—Vikkram Bali
(74) Attorney, Agent, or Firm—David M. Woods (57) ABSTRACT

An event clustering method uses foreground and background segmentation for clustering images from a group into similar events. Initially, each image is divided into a plurality of blocks, thereby providing block-based images. Utilizing a block-by-block comparison, each block-based image is segmented into a plurality of regions comprising at least a foreground and a background. One or more luminosity, color, position or size features are extracted from the regions and the extracted features are utilized to estimate and compare the similarity of the regions comprising the foreground and background in successive images in the group. Then, a measure of the total similarity between successive images is computed, thereby providing image distance between successive images, and event clusters are delimited from the image distances.

18 Claims, 8 Drawing Sheets

EVENT CLUSTERING OF IMAGES USING FOREGROUND/BACKGROUND SEGMENTATION

FIELD OF THE INVENTION

The invention relates generally to the field of auto albuming of consumer-captured images, and in particular to a system for classifying consumer-captured images by event similarity.

BACKGROUND OF THE INVENTION

Pictorial images are often classified by the particular event, subject or the like for convenience of retrieving, reviewing and albuming of the images. Typically, this has been achieved by manually segmenting the images, or by an automated method that groups the images by color, shape or texture in order to partition the images into groups of similar visual content. It is clear that an accurate determination of content would make the job easier. Although not directed to event classification, there is a body of prior art addressing content-based image retrieval and the content description of images. Some typical references are described below.

In U.S. Pat. No. 6,072,904, "Fast image retrieval using multi-scale edge representation of images", a technique for image retrieval uses multi-scale edge characteristics. The target image and each image in the data base are characterized by a vector of edge characteristics within each image. Retrieval is effected by a comparison of the characteristic vectors, rather than a comparison of the images themselves. In U.S. Pat. No. 5,911,139, "Visual image database search engine which allows for different schema", a visual information retrieval engine is described for content-based search and retrieval of visual objects. It uses a set of universal primitives to operate on the visual objects, and carries out a heterogeneous comparison to generate a similarity score. U.S. Pat. No. 5,852,823, "Image classification and retrieval system using a query-by-example paradigm", teaches a paradigm for image classification and retrieval by query-by-example. The method generates a semantically based, linguistically searchable, numeric descriptor of a pre-defined group of input images and which is particularly useful in a system for automatically classifying individual images.

The task addressed by the foregoing three patents is one of image retrieval, that is, finding similar images from a database, which is different from the task of event clustering for consumer images, such as photo album organization for consumer images. The descriptors described in these patents do not suggest using foreground and background segmentation for event clustering. Most importantly, the segmentation of images into foreground and background is not taken into account as an image similarity measure.

Commonly-assigned U.S. Pat. No. 6,011,595, "Method for segmenting a digital image into a foreground region and a key color region", which issued Jan. 4, 2000 to T. Henderson, K. Spaulding and D. Couwenhoven, teaches image segmentation of a foreground region and a key color backdrop region. The method is used in a "special effects" process for combining a foreground image and a background image. However, the foreground/background separation is not used for image similarity comparison.

Commonly assigned U.S. patent application Ser. No. 09/163,618, "A method for automatically classifying images into events", filed Sep. 30, 1998 in the names of A. Loui and E. Pavie, and commonly-assigned U.S. patent application Ser. No. 09/197,363, "A method for automatically comparing content of images for classification into events", filed Nov. 20, 1998 in the names of A. Loui and E. Pavie, represent a continuous effort to build a better system of event clustering for consumer images, albeit with different technical approaches. Ser. No. 09/163,618 discloses event clustering using date and time information. Ser. No. 09/197,363 discloses a block-based histogram correlation method for image event clustering, which can be used when date and time information is unavailable. It teaches the use of a main subject area (implemented by fixed rectangle segmentation) for comparison, but does not propose any automatic method of performing foreground/background segmentation, which would be more accurate than a fixed rectangle.

Two articles—one by A. Loui, and A. Savakis, "Automatic image event segmentation and quality screening for albuming applications," *Proceedings IEEE ICME* 2000, New York, August, 2000 and the other by John Platt, "AutoAlbum: Clustering digital photographs using probabilistic model merging", *Proceedings IEEE Workshop on Content-based Access of Image and Video Libraries,* 2000—specifically relate to event clustering of consumer images; however they do not look into regions of images and take advantage of the foreground and background separation. Loui and Savakis teach an event clustering scheme based on date and time information and general image content. Platt teaches a clustering scheme based on probabilistic merging of images. Both of them fail to address the foreground and background separation.

What is needed is a system for segmenting images into coarse regions such as foreground and background and deriving global similarity measures from the similarity between the foreground/background regions. Furthermore, such a system should not become confused by unnecessary details and irrelevant clusters in consumer images.

SUMMARY OF THE INVENTION

The present invention is directed to overcoming one or more of the problems set forth above. Briefly summarized, according to one aspect of the present invention, an event clustering method uses foreground and background segmentation for clustering images from a group into similar events. Initially, each image is divided into a plurality of blocks, thereby providing block-based images. Utilizing a block-by-block comparison, each block-based image is segmented into a plurality of regions comprising at least a foreground and a background. One or more features, such as luminosity, color, position or size, are extracted from the regions and the extracted features are utilized to estimate and compare the similarity of the regions comprising the foreground and background in successive images in the group. Then, a measure of the total similarity between successive images is computed, thereby providing image distance between successive images, and event clusters are delimited from the image distances.

This invention further includes a system for event clustering of consumer images using foreground/background segmentation, which can be used for auto albuming and related image management and organization tasks. The goal of the disclosed system is to classify multiple consumer photograph rolls into several events based on the image contents, with emphasis on the separation of foreground and background. An important aspect of this system is automatic event clustering based on foreground and background segmentation, leading to better similarity matching between images and performance improvement. Another advantage of the present invention is the use of a block-based approach for segmentation, which will be more computationally efficient than a pixel-based segmentation scheme.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

In the following description, a preferred embodiment of the present invention will be described in terms that would ordinarily be implemented as a software program. Those skilled in the art will readily recognize that the equivalent of such software may also be constructed in hardware. Because image manipulation algorithms and systems are well known, the present description will be directed in particular to algorithms and systems forming part of, or cooperating more directly with, the system and method in accordance with the present invention. Other aspects of such algorithms and systems, and hardware and/or software for producing and otherwise processing the image signals involved therewith, not specifically shown or described herein, may be selected from such systems, algorithms, components and elements known in the art. Given the system as described according to the invention in the following materials, software not specifically shown or described herein that is useful for implementation of the invention is conventional and within the ordinary skill in such arts.

Still further, as used herein, the computer program may be stored in a computer readable storage medium, which may comprise, for example; magnetic storage media such as a magnetic disk (such as a hard drive or a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program.

This invention discloses a system for event clustering of consumer images using foreground/background segmentation, which can be used for auto albuming and related image management and organization tasks. It is a challenging task to automatically organize consumer images without any content description into semantically meaningful events. The goal of the disclosed system is to classify multiple consumer photograph rolls into several events based on the image contents, with emphasis on the separation of foreground and background. An important aspect of this disclosure is automatic event clustering based on foreground and background segmentation, leading to better similarity matching between images and performance improvement.

Figure 1:
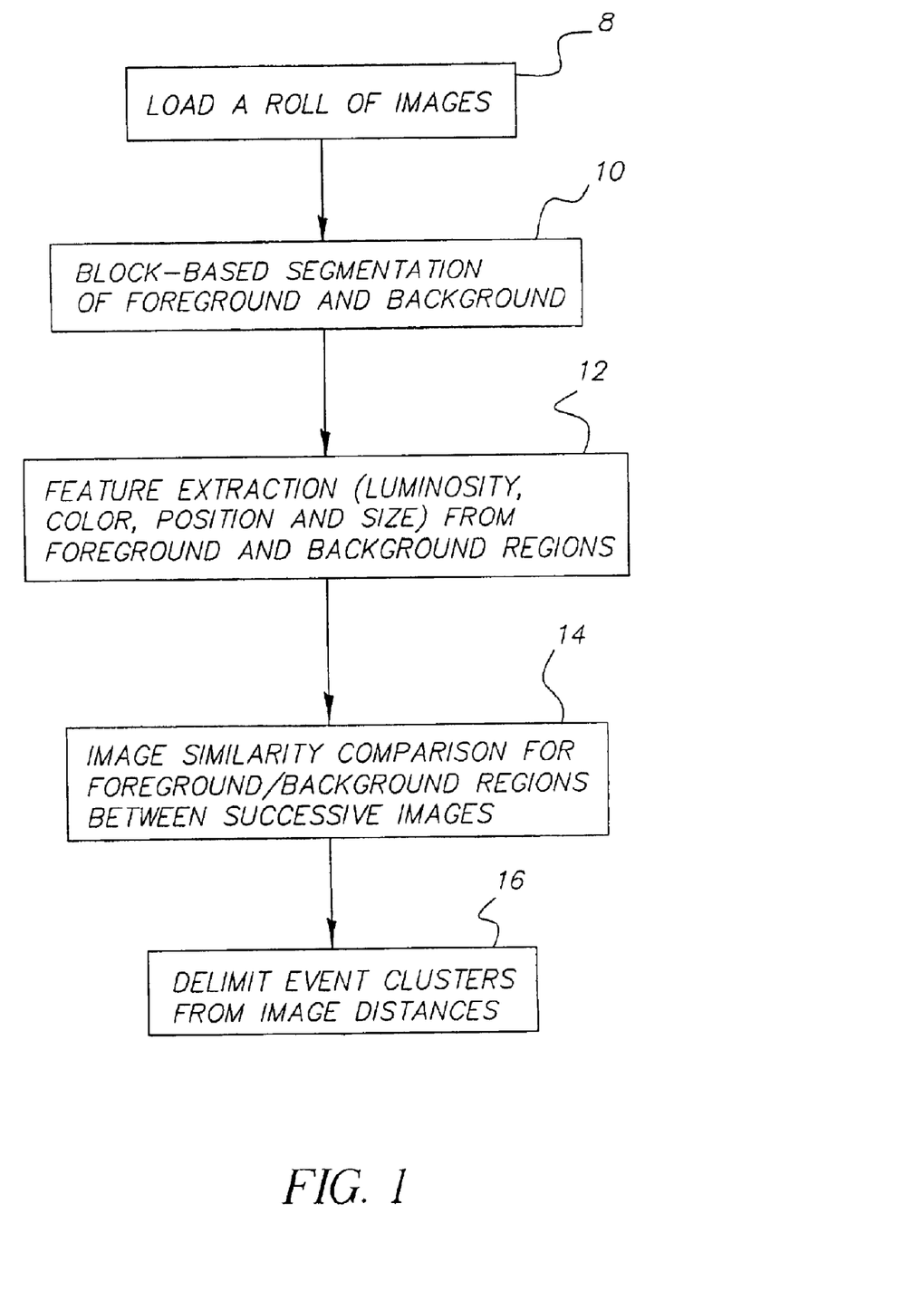
FIG. 1 shows a block diagram of event clustering using block-based foreground/background segmentation according to the invention.

Referring first to FIG. 1, an event clustering system according to the invention operates on a group of images 8, which may be images scanned from a roll of film or provided from other sources, such as from a database of images. The images are typically consumer images since that is where the greater value for event clustering may be found, but there is no requirement for the images to be such. The event clustering algorithm is composed of four major modules, as follows:

A first module 10 for segmenting each of the images in the group into regions comprising a foreground and a background;

A second module 12 for extracting one or more low-level features, such as luminosity, color, position and size, from the regions comprising the foreground and the background;

A third module 14 for computing distances (dissimilarities) between successive images considering all the regions in the foreground and the background, meanwhile taking advantage of the memory of frame order; and A fourth module 16 for determining the greatest distance between images in the group, including successive images and more distantly separated images, in order to delimit the clusters.

Since the invention may also be thought of as a method for event clustering, each of the foregoing modules may also be thought of as the steps that would be implemented in performing the method.

Figure 2A:
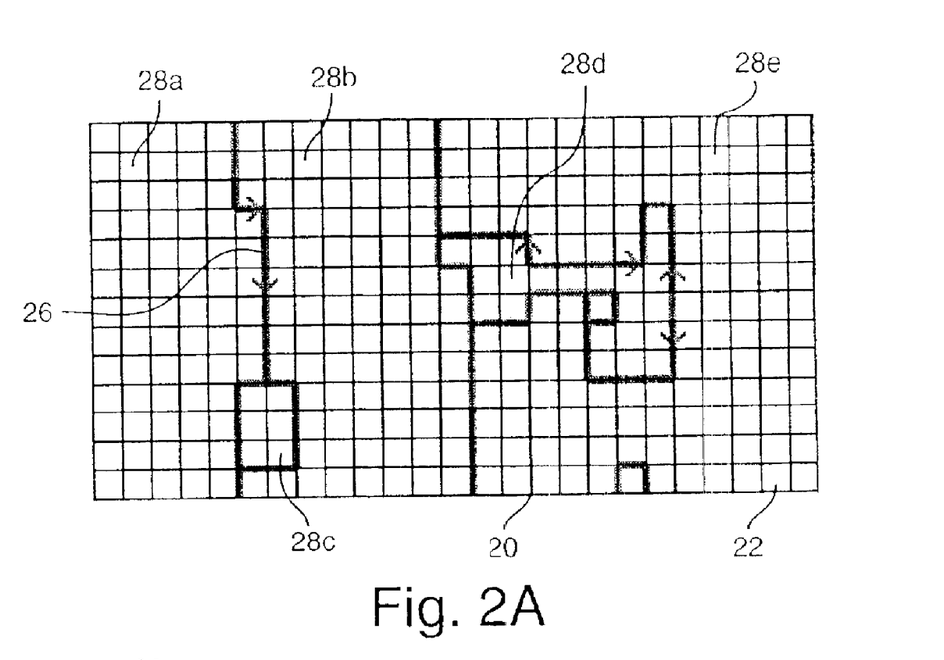
FIGS. 2A and 2B show details of the block-based segmentation technique shown in FIG. 1, in particular showing the joining of block boundary separations to form regions.
Figure 2B:
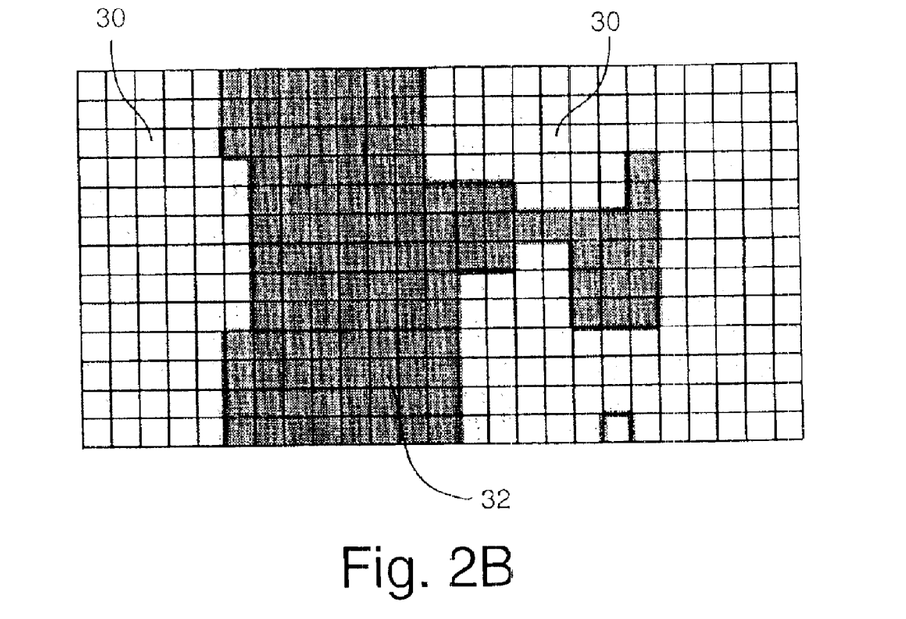
Figure 3:
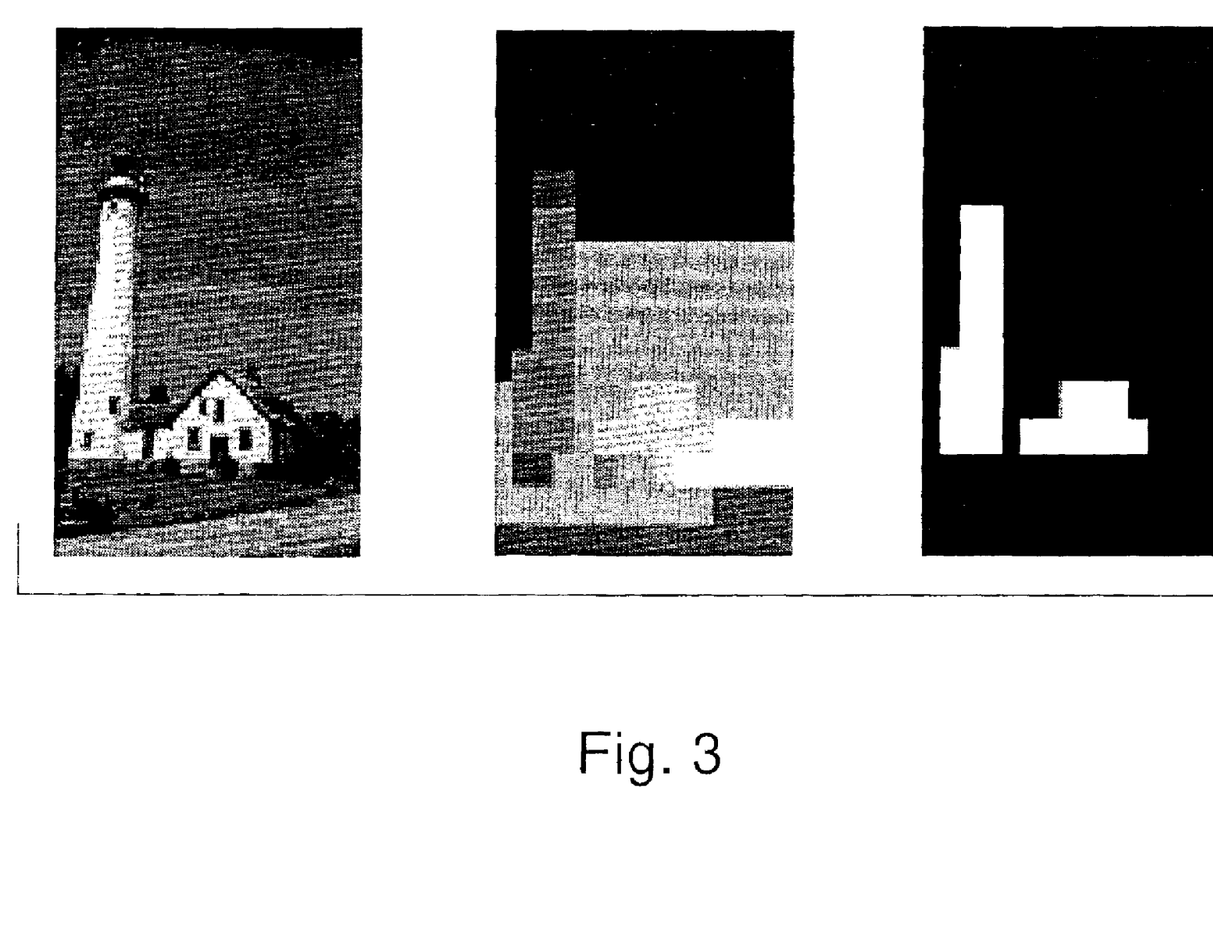
FIG. 3 demonstrates an example of foreground and background segmentation according to the invention.

Since a fine and accurate segmentation of background and foreground is difficult and computationally expensive, a coarse segmentation of foreground and background is preferred and adequately serves the purpose. Accordingly, in the first module 10, the image is divided into blocks and the dissimilarity between neighboring blocks is computed to connect different block-to-block separations to form regions, as shown in FIGS. 2A and 2B. More specifically, an image is first divided into rectangular blocks with respect to a grid outline 20. Then, for each rectangular block 22, its distance (dissimilarity) is computed with respect to its neighboring blocks using the features that will be described subsequently in connection with the second module 12. (Preferably, the distances calculated in equations (3) and (4) are used to establish block-to-block dissimilarity.) The greatest distances are then identified and used to establish initial separation boundaries between the rectangular blocks.

Where the initial separation boundaries are isolated from each other or the image border, they are then connected to each other or the image border along intervening block boundaries of greatest remaining distance (as shown by the arrow connections 26 in FIG. 2A) until all separation boundaries are connected to form a plurality of regions 28a, 28b . . . 28e. Then the regions are merged two by two by computing the distances (dissimilarity) between all the regions 28a . . . 28e and merging those regions that have the smallest distances. This is repeated until two combinations of regions remain. Different region characteristics, such as size, position and contact with the image borders, are then used to distinguish background from foreground. For instance, a large centrally positioned combination of regions is likely to be a foreground and the remaining combination of outwardly positioned regions is likely to be a background. As shown in FIG. 2B, this optimally results in two distinct combinations of regions: regions 28a and 28e comprising a background 30 and regions 28b, 28c and 28d comprising a foreground 32. As an example of an actual image, FIG. 3 shows the approximate foreground and background segmentation of a lighthouse image using the foregoing block-based approach.

In certain situations, especially where a small region of the image is quite different from the rest of the image, the block-based segmentation process may provide a foreground or a background of only a few blocks. These few blocks may not be sufficient for an accurate background/foreground segmentation. To avoid this outcome, when a predetermined number of regions formed in the segmentation process are each less than a predetermined size, the foreground is approximated by a rectangle of fixed size and position (the predetermined numbers may be empirically determined.) Intuitively, this rectangle position is in the center between left and right borders and just below the center between top and bottom borders. As will be shown later in connection with FIG. 8, allowing for this variation from the main segmentation process for these certain situations provides improved results.

While this block-based segmentation is preferred for its simplicity and efficiency, other automated segmentation techniques may be employed. For example, the segmentation method employed in commonly assigned, copending U.S. patent application Ser. No. 09/223,860, entitled "Method for Automatic Determination of Main Subjects in Photographic Images" filed Dec. 31, 1998 in the names of J. Luo et al., which is incorporated herein by reference, may be used, albeit at a certain price in computational complexity. This segmentation method provides a two-level segmentation, as follows A first level composed of several regions, which are homogeneous.

A second level that groups the regions from the first level to form a foreground, a background and an intermediate region.

In addition, in certain situations the block-based segmentation process may turn up an uncertain region that will best be categorized as an intermediate region since its distance from other regions is not sufficient to clearly associate it with either background or foreground.

After the image has been segmented in the first module 10, one or more low level features such as luminosity, color, position, and size are extracted in the second module 12 from the regions comprising the foreground 30 and the background 32. At this stage, each feature extraction algorithm also has at its disposal the original image information and the mask(s) created as a result of the segmentation, which are used to separate the foreground and background image information. The feature extraction algorithm for luminosity is based on the formula for YUV conversion:

$$y = 0.299 \times R + 0.587 \times G + 0.114 \times B \qquad \text{Eq. (1)}$$

where Y is luminance and RGB represents the color information obtained from individual pixels of the image. The mean luminosity is computed for the regions comprising the foreground and background. The distance between two different regions is simply the absolute value of the difference of these means. Based on this feature, images may be separated into outdoors images, well highlighted images, and images taken during the night, indoor, or in a dark environment.

To compute the color feature of a region, the hue (H), intensity (I) and saturation (S) are first quantized using the equations:

$$\begin{cases} I = \dfrac{R+G+B}{3} \\ S = 1 - \dfrac{\min(R,G,B)}{I} \\ H = \cos^{-1}\left( \dfrac{\frac{1}{2} \times (R-G) + (R-B)}{\left((R-G)^2 + (R-B)(G-B)\right)^{\frac{1}{2}}} \right) \end{cases} \qquad \text{Eq. (2)}$$

Every region in the image is represented by a color set. To compute the distance between two color sets $c_0$ and $c_1$, the distance is calculated and then a component is added to account for the different sizes of the regions, thereby giving more or less emphasis to each component. Given two color set components $m_0 = (h_0, i_0, s_0)$ and $m_1 = (h_1, i_1, s_1)$, the distance is calculated as follows:

$$d_{m_0, m_1} = h_{coeff} \times \min(|h_1 - h_0|, h_{max} - |h_1 - h_0|) + i_{coeff} \times |i_1 - i_0| + s_{coeff} \times |s_1 - s_0|$$
where $h_{coeff}$, $i_{coeff}$ and $s_{coeff}$ are determined by the user. Eq. (3)

Then distance between the two color sets $c_0$ and $c_1$ is determined by $$d_{c0,c1} = \frac{1}{n_0 \times n_1} \sum_{m_0 \in c_0} \sum_{m_1 \in c_1} c_0[m_0] \cdot d_{m_0,m_1} \cdot c_1[m_1] \qquad \text{Eq. (4)}$$

where $n_0$ and $n_1$ are the number of pixels of regions 0 and 1 and c[m] is the number of pixel in color set c for level m.

It may be further desirable to consider the position and size features of the different regions. For example, higher weights may be assigned to the regions in the central part of the image.

Figure 4:
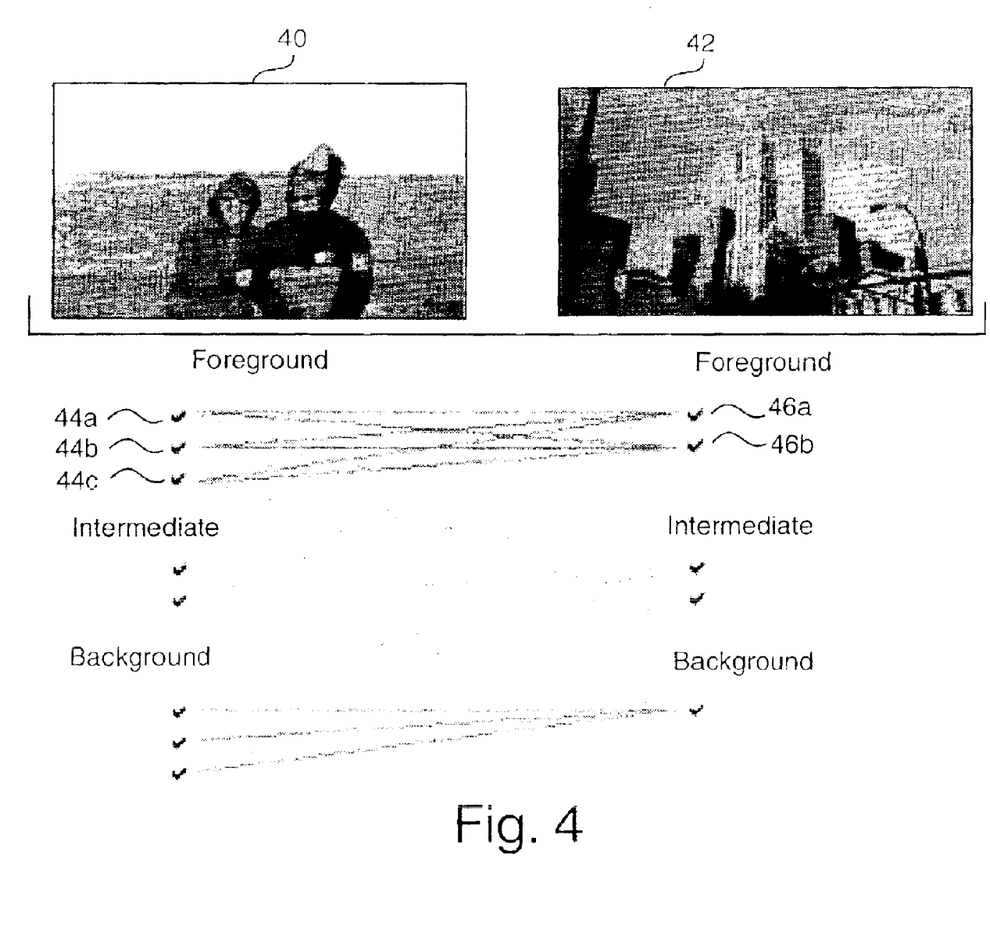
FIG. 4 illustrates the comparison of distance (dissimilarity) measures generated for regions comprising the foreground and background in two images.

After the low level features and distances have been extracted and the regions comprising the foreground and background have been determined for each image, distances are computed in the module 14 between different regions (resulting from the segmentation) of different images 40 and 42 from the same group, as shown in FIG. 4. The goal of this step is to compute the distances between different images, considering all the regions in each image, where the distance metrics are those used for the block-based segmentation (e.g., the luminosity distance and/or the color set distance).

For each image, there are different regions comprising the foreground and background and perhaps further regions comprising an intermediate area. The goal is to compare regions of the same type, e.g., foreground to foreground and background to background, except in the case of the intermediate areas, where they are compared with each other and with regions comprising both background and foreground. More specifically, referring to FIG. 4, three regions 44a, 44b, 44c comprising the foreground of image 40 are compared to two regions 46a and 46b comprising the foreground of image 42. Likewise, although not separately enumerated, the three regions (indicated by check marks) comprising the background of image 40 are compared to the single region (also indicated by a check mark) comprising the background of image 42. FIG. 4 also illustrates the situation of intermediate areas, where the two regions comprising the intermediate areas of images 40 and 42 are compared with each other and with the regions comprising the foreground and background of the two images.

After the distances between the different regions comprising the foreground and background in successive images have been computed, a total distance between the images is computed in module 14 using a harmonic mean equation, as follows:

$$\text{harmonic mean } (a_1, a_2, \ldots, a_n) = \frac{1}{\frac{1}{a_0} + \frac{1}{a_1} + \ldots + \frac{1}{a_n}} \quad \text{Eq. (5)}$$

where $a_i$ is the dissimilarity (distance) between the individual regions comprising the foreground and background in the respective images.

After the total dissimilarity between successive images has been determined in the module 14, event clusters are determined in module 16 according to the image distance of the respective images. Given the distances between successive images, a threshold may be chosen and all distances above this threshold are determined to be separations between different event clusters. Conversely, differences below the threshold are not to be taken as event separations, and such images belong to the same event. The threshold may be a constant number or a function of the statistical characteristics of the distance distribution (such as the maximum distance, the average distance, the variance, and so on), or the number of desired clusters, or the entropy of the whole distribution (entropy thresholding is described in N. R. Pal and S. K. Pal. "Entropic Thresholding," *Signal Processing*, 16, pp. 97–108, 1989). In a preferred implementation, the threshold is a function of the average and the maximum distances in the group of images.

Figure 5A:
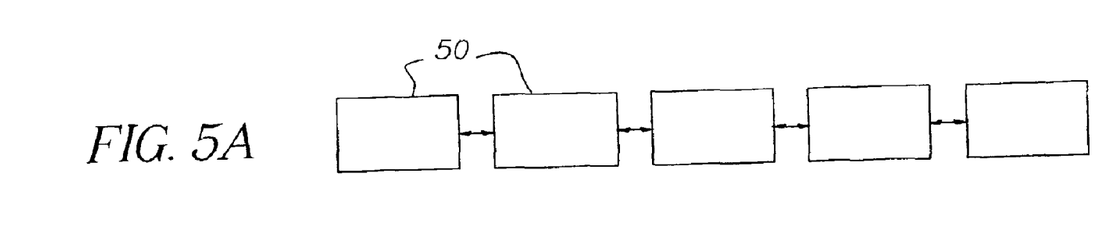
FIGS. 5A, 5B and 5C show the use of memory to compute distance between successive and more distant images in a chronological sequence of such images.
Figures 5B, 5C:
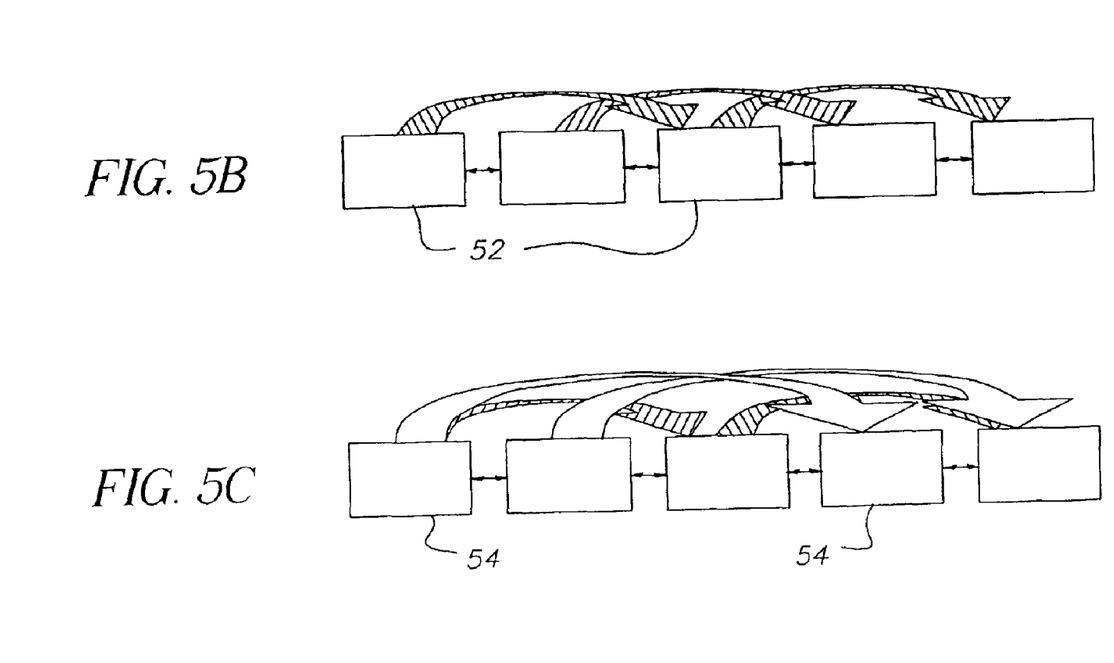

Sometimes, there may be a chronological order of several images apparently belonging to the same event, and all are similar except for one (or a few) images in between. To take advantage of the chronological order of the images, memory can be employed not only to compute the distance between successive (that is, adjacent) images, but also to compute the distance between more distantly separated images. As shown in FIGS. 5A, 5B and 5C, when a decision is made on whether there is an event break, the adjacent images 50 (no memory) may be compared (FIG. 5A), every other image 52 (1-image memory) may be compared (FIG. 5B) or every other two images 54 (2-image memory) may be compared (FIG. 5C). More specifically, the total distance measured by the harmonic mean may be taken between the respective images to determine if the group of images belong to the apparent event.

Figure 6:
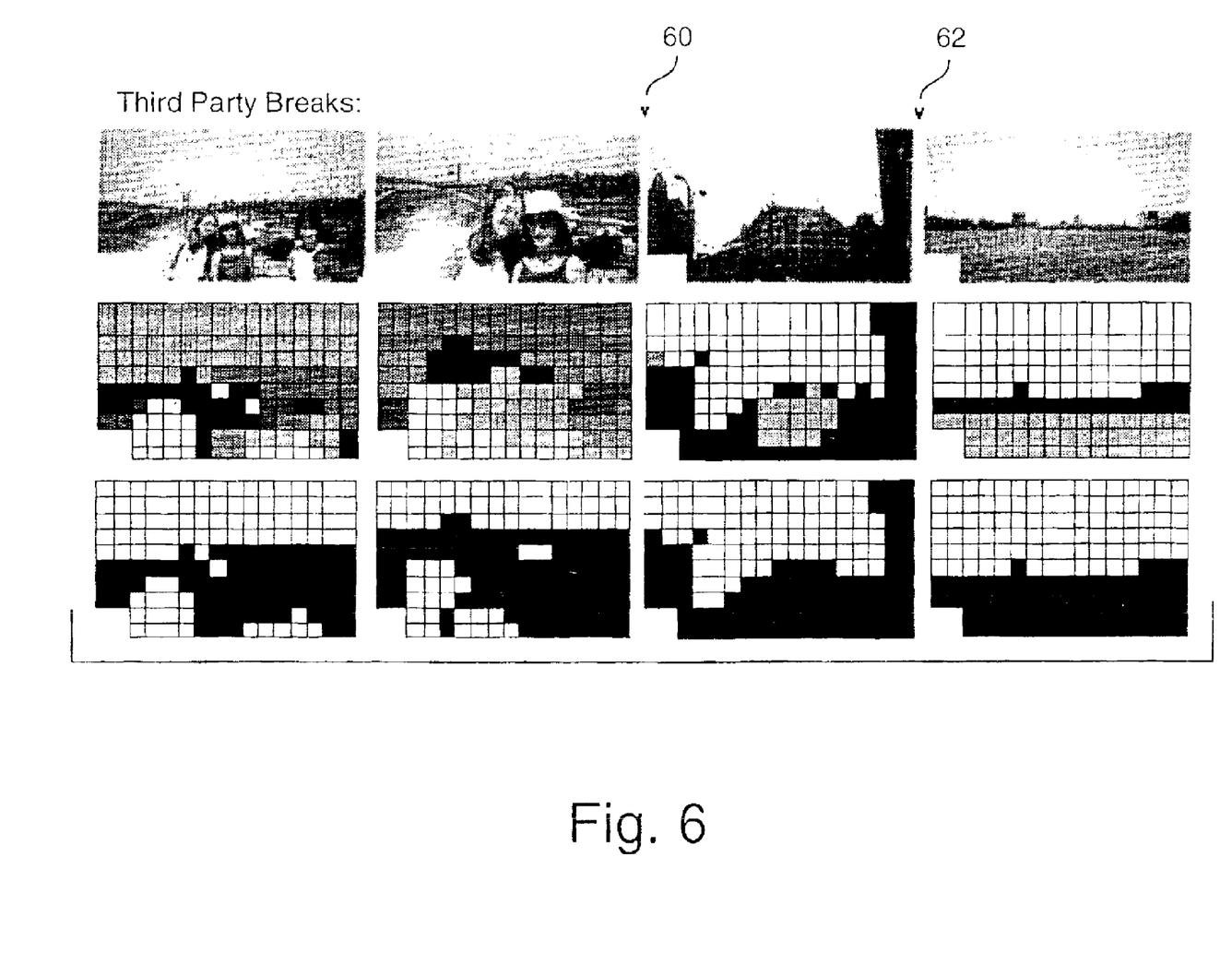
FIG. 6 shows an example of foreground and background separation for four consumer images.
Figure 7:
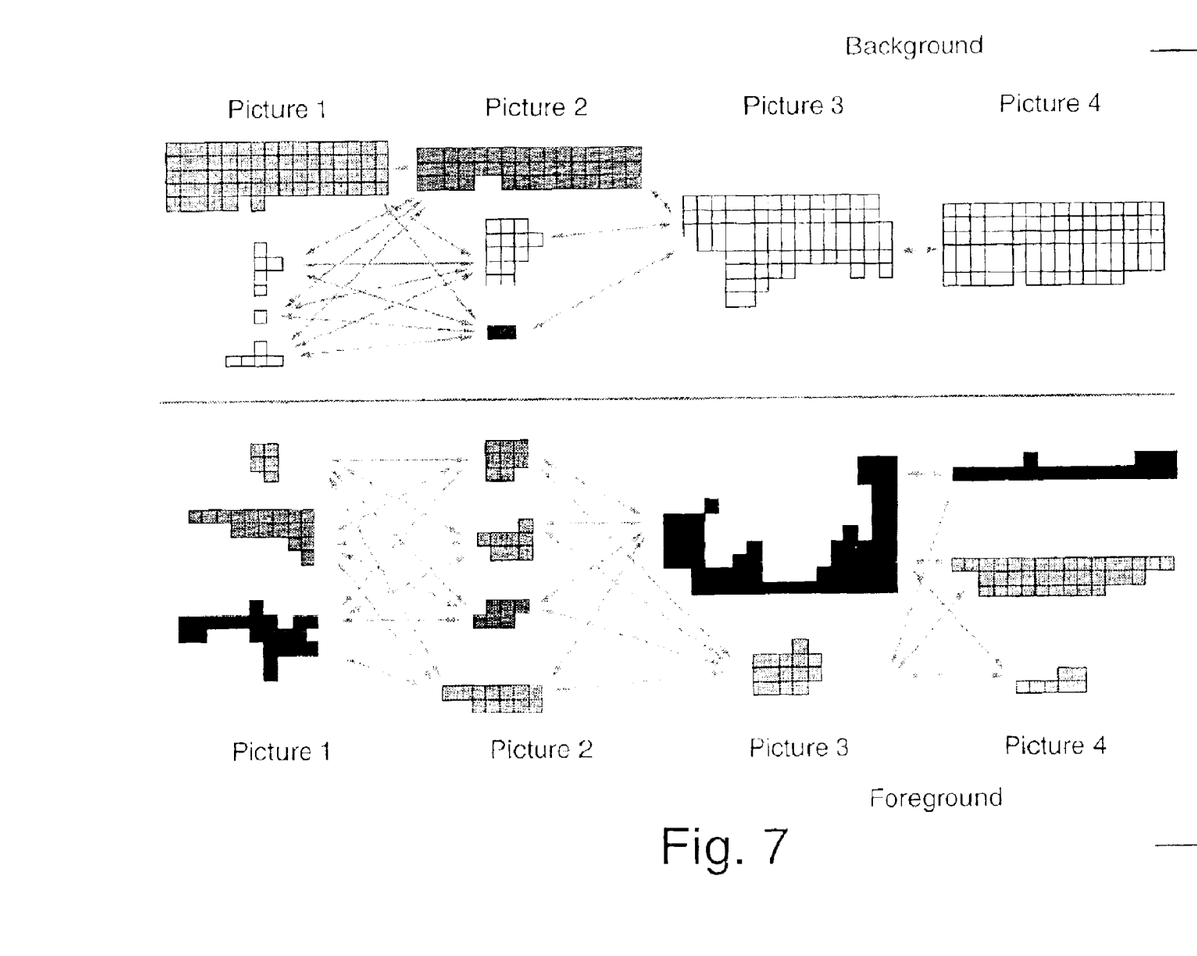
FIG. 7 shows a similarity comparison between the foreground and background regions of the four images shown in FIG. 6.

It facilitates an understanding of the invention to examine an event clustering example for several images using foreground and background separation. FIG. 6 shows an example of foreground and background separation for four typical consumer images. Two event breaks are detected, one event break 60 between images 2 and 3, and the other event break 62 between images 3 and 4. The first row of images shows the four images. The second and third rows show the results of 1-level and 2-level foreground and background segmentation. FIG. 6 also demonstrates the foreground and background separation results using a block-based approach. The regions comprising the foreground and background between these images are compared for similarity, as shown in FIG. 7, and their respective distances are used for event clustering.

A precision recall plot is used to evaluate the event-clustering algorithm. The recall and precision are defined as $$\text{recall} = \frac{\#\text{correct} + 1}{\#\text{correct} + \#\text{missed} + 1} \quad \text{Eqs. (6)}$$

$$\text{precision} = \frac{\#\text{correct} + 1}{\#\text{correct} + \#\text{false\_positive} + 1}$$

where recall indicates how many event breaks are missed and precision shows how many event breaks are falsely detected while there is no event break. The numbers are between 0 and 1. The bigger the numbers, the better the system performance.

Figure 8:
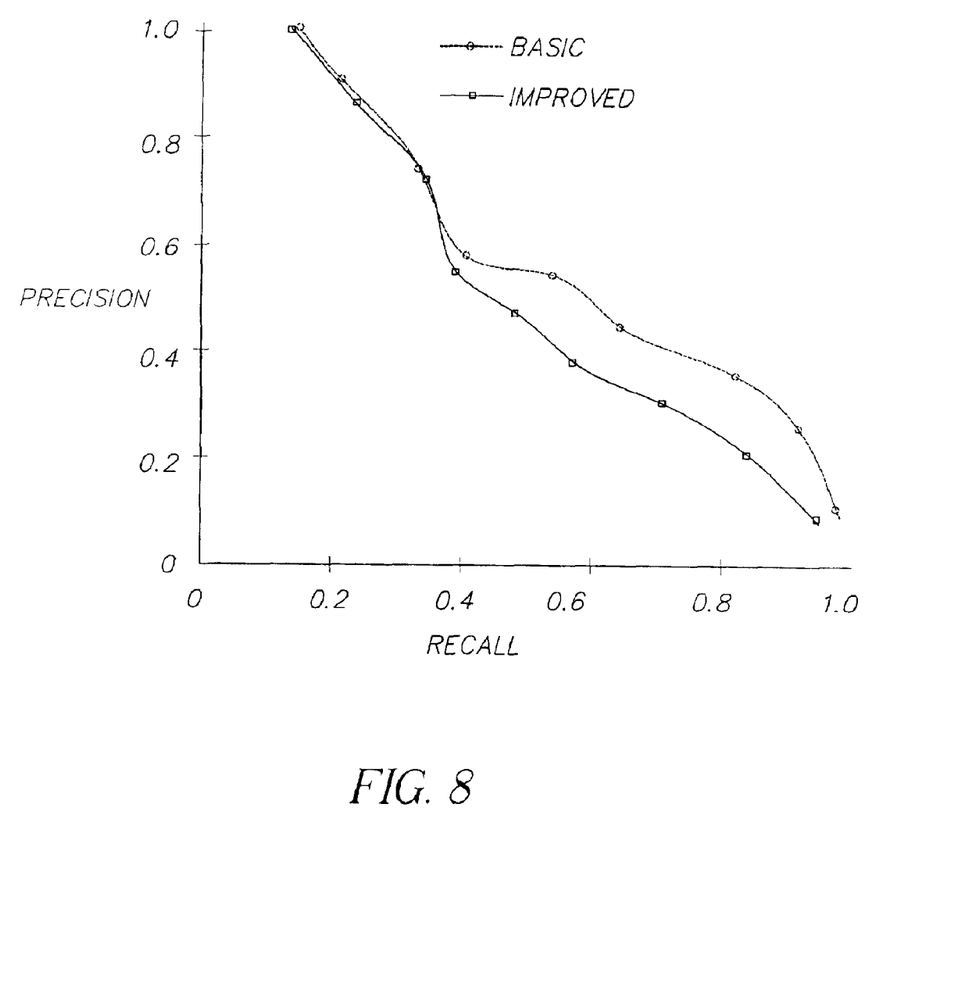
FIG. 8 is a precision recall plot showing the event clustering performance using foreground and background segmentation.

The event-clustering algorithm has been tested on 2600 typical consumer images. The recall/precision performance with no memory is shown in FIG. 8. The basic approach used the block-based foreground and background separation. The improved approach indicates a combination of block based foreground/background segmentation and, for the special situation described earlier, fixed rectangular foreground/background separation, where the segmentation is simply replaced by a fixed rectangle in the foreground. To this end, the system has achieved precision of 58% and recall of 58% on event clustering of 2600 consumer images using 2-image memory.

The subject matter of the present invention relates to digital image understanding technology, which is understood to mean technology that digitally processes a digital image to recognize and thereby assign useful meaning to human understandable objects, attributes or conditions and then to utilize the results obtained in the further processing of the digital image.

The invention has been described in detail with particular reference to certain preferred embodiments thereof, but it will be understood that variations and modifications can be effected within the spirit and scope of the invention. For instance, the idea of using foreground and background segmentation for event clustering can be extended to using multiple regions as well.

Parts List 10 first module
12 second module
14 third module
16 fourth module
20 grid outline
22 rectangular block
24 initial separation
26 arrow extensions
28 regions
30 background
32 foreground
40 image
42 image
44a . . . regions comprising foreground
46a . . . regions comprising foreground
50 adjacent image
52 every other image
54 every other two images
60 first event break
62 second event break

What is claimed is:

1. An event clustering method for clustering images comprising similar events into same event image groups from a group of images, said event clustering method comprising the steps of:

(a) segmenting each image within the group of images into a plurality of image regions, said image regions comprising at least one a foreground and background segmentation;

(b) extracting at least one feature from each of a plurality of successive images from the group of images to form a feature set, each of said at least one feature deriving from said at least one foreground and background segmentation, said features comprising at least one of luminosity, color, position and size of said plurality of image regions;

(c) computing a plurality of similarity measures for said plurality of successive images as a function of the similarity of said at least one feature within said feature set;

(d) measuring a plurality of image distances between successive images as a function of said plurality of similarity measures; and (e) delimiting a set of event clusters as a function of said plurality of image distances, whereby each of said set of event clusters comprises a plurality of same event image groups, said same event image groups comprising images pertaining to a set of same events.

2. The method as claimed in claim 1 wherein the step (c) further comprises the step of computing a plurality of similarity measures for said plurality of successive images as a function of the similarity of said at least one feature within said feature set generating a distance measure that indicates the similarity or dissimilarity between said image regions.

3. The method as claimed in claim 1 wherein if a predetermined number of said image regions formed in step (a) are each less than a predetermined size, then a fixed image region is generated for the foreground within said foreground and background segmentation.

4. The method as claimed in claim 1 wherein the group of images are arranged in a chronological order and step (c) further comprises the step of computing a plurality of similarity measures for said plurality of successive images as a function of the similarity of said at least one feature within said feature set or estimating and comparing the similarity of said image regions comprising said foreground and background segmentation in every other image in the group of images and step (d) further comprises the step of measuring a plurality of image distances according to the total similarity between successive images and every other image.

5. The method as claimed in claim 1 wherein the group of images are arranged in a chronological order and step (c) further comprises the step of computing a plurality of similarity measures for said plurality of successive images as a function of the similarity of said at least one feature within said feature set estimating and comparing the similarity of said image regions comprising said foreground and background segmentation in every other two images in the group of images and step (d) comprises the step of measuring a plurality of image distances according to the total similarity between successive images and every other two images.

6. A computer storage medium having instructions stored therein for causing a computer for perform the method of claim 1.

7. An event clustering method using foreground and background segmentation for clustering images from a group of images into same event image groups, said event clustering method including the steps of:

(a) dividing each image into a plurality of blocks, thereby providing block-based images;

(b) utilizing a block-by-block comparison to segment each block-based image into a plurality of regions comprising at least foreground and background segmentation;

(c) extracting at least one feature from each of a plurality of successive images from the group of images to form a feature set, each of said at least one feature deriving from said at least one the foreground and background segmentation, said features comprising at least one of luminosity, color, position and size of the regions;

(d) computing a plurality of similarity measures for said plurality of successive images as a function of the similarity of said at least one feature within said feature set, thereby leading to a plurality of image distance measures as a function of said plurality of similarity measures between successive images; and (e) delimiting a set of event clusters as a function of said plurality of image distances, whereby each of said set of event clusters comprises a plurality of same event image groups, said same event image groups comprising images pertaining to a set of same events.

8. The method as claimed in claim 7 wherein the block-by-block comparison in step (b) comprises extracting one or more of said features from the blocks, utilizing the features to compute the similarity of each block with respect to its neighboring blocks, forming regions from similar blocks and merging similar regions into a background and a foreground segmentation.

9. A computer storage medium having instructions stored therein for causing a computer for perform the method of claim 7.

10. The method as claimed in claim 7 wherein if a predetermined number of regions formed in step (b) are each less than a predetermined size, then a fixed regions is generated for the foreground.

11. An event clustering method using foreground and background segmentation for clustering images from a group of images into similar events, said method including the steps of:

(a) dividing each image into a plurality of blocks, thereby providing block-based images;

(b) utilizing a block-by-block comparison to segment each block-based image into a plurality of regions, wherein a first combination of regions comprises a foreground segmentation and a second combination of regions comprises a background segmentation;

(c) extracting one or more features from said plurality of regions comprising said foreground segmentation and background segmentation, said features comprising at least one of luminosity, color, position and size of the regions;

(d) computing a similarity measure between each region of the combination comprising a foreground segmentation of one image in the group and each region comprising the foreground segmentation of another image in the group of images, and further computing a similarity measure between each region of the combination comprising the background segmentation of said one image in the group of images and each region comprising the background segmentation of said another image in the group of images;

(e) computing a mean value measure of the total similarity between successive images based on the similarity of all regions included in the combinations comprising said foreground segmentation and said background segmentation, thereby providing a measure of image distance between said images; and (f) delimiting a set of event clusters as a function of said plurality of image distances, whereby each of said set of event clusters comprises a plurality of same event image groups, said same event image groups comprising images pertaining to a set of same events.

12. The method as claimed in claim 11 wherein said (d) further comprises the step of computing a component to account for the relative sizes of the regions.

13. A computer storage medium having instructions stored therein for causing a computer for perform the method of claim 11.

14. A method for clustering a sequence of images into events based on similarities between the images, said method comprising the steps of:

(a) segmenting each image into a plurality of regions, including combinations of one or more regions comprising a foreground and a background segmentation;

(b) extracting low-level features from said plurality of regions;

(c) utilizing the low-level features for comparing said plurality of regions comprising said foreground and background segmentation of successive images, said comparison generating an image similarity measure for said regions comprising said foreground and background segmentation of the successive images;

(d) combining the image similarity measures for the regions comprising said foreground and background segmentation of said successive images for obtaining a global similarity measure; and (e) delimiting event clusters by using said global similarity measure.

15. The method as claimed in claim 14 wherein said low-level features further comprise at least one of luminosity, color, position and size of said regions.

16. A system using foreground and background segmentation for clustering images from a group of images into a plurality of similar events image groups, said system comprising:

(a) a first module for dividing each image into a plurality of blocks, thereby providing block-based images, said first module then utilizing a block-by-block comparison to segment each block-based image into a plurality of regions comprising at least a foreground and a background segmentation;

(b) a second module for extracting one or more features from the regions comprising said foreground and background segmentation, said features comprising at least one of luminosity, color, position and size of the regions;

(c) a third module for utilizing the features to compute the similarity of the regions comprising the foreground and background segmentation of successive images in the group, whereby said similarity includes a component to account for the relative sizes of the regions, said third module computing a mean value measure of the total similarity between successive images, thereby providing a measure of image distance between successive images; and (d) a fourth module for delimiting event clusters from the image distances, whereby the event clusters include groups of images pertaining to the same events.

17. The system as claimed in claim 16 wherein the group of images are arranged in a chronological order and said third module further utilizes the features to estimate and compare the similarity of regions comprising foreground and background segmentation in every other image in the group of images and computes a measure of the total similarity between every other image, thereby providing image distance between successive images and every other image.

18. The system as claimed in claim 16 wherein the group of images are arranged in a chronological order and the third module further utilizes the features to estimate and compare the similarity of regions comprising foreground and background segmentation in every other two images in the group of images and computes a measure of the total similarity between every other two images, thereby providing image distance between successive images and every other two images.

* * * * *